Patented Nov. 11, 1941

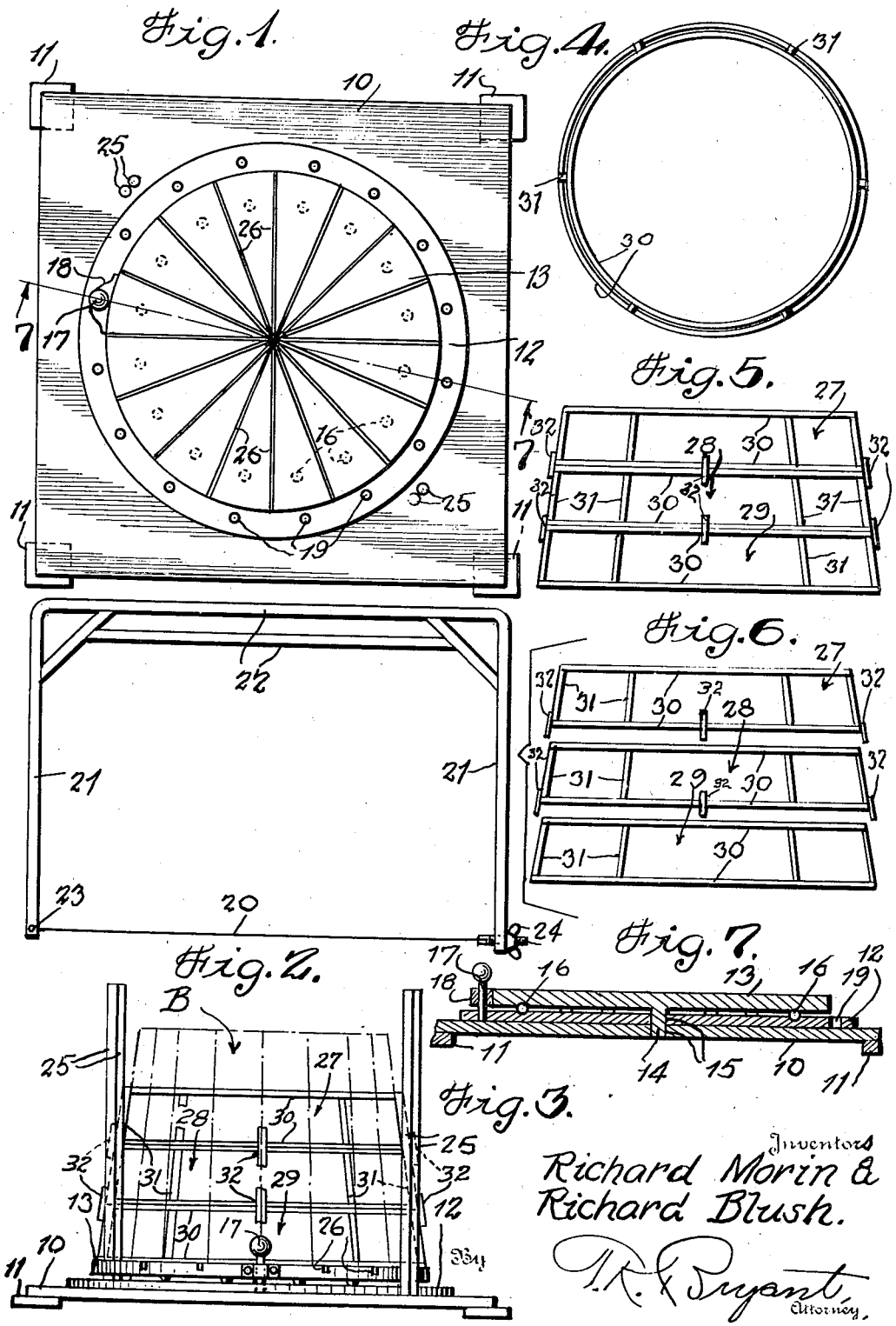

2,261,938

UNITED STATES PATENT OFFICE 2,261,938

TUB-BUTTER CUTTER

Richard Morin and Richard Blush,
New Orleans, La.

Application July 1, 1939, Serial No. 282,554

1 Claim. (Cl. 31—23)

This invention relates to certain new and useful improvements in tub-butter cutter.

The primary object of the invention is to provide a tub-butter cutter of extremely simple construction, one that is inexpensive to manufacture and wherein the block of butter in tub form is cut into equal sized prints with all wastage eliminated.

A further object of the invention is to provide a tub-butter cutter of the foregoing character wherein a single wire is employed for the vertical cut, being guided in its movement for accuracy in its cutting passage through the block of butter.

It is a further object of the invention to provide a tub-butter cutter wherein there is provided a plurality of superposed ring members placed in enclosing relation with the tub-butter block to form guides for a wire moved transversely of the block, the vertical cut through the tub-butter block resulting in the cutting of segments of butter of equal weight.

With the above and other objects in view that will become apparent as the nature of the invention is better understood, the same consists in the novel form, combination and arrangement of parts hereinafter more fully described, shown in the accompanying drawing and claimed.

In the drawing:

Figure 1 is a top plan view of a tub-butter cutter constructed in accordance with the present invention, showing a turn-table for the support of the tub-butter block with intersecting transverse grooves or slots in its upper face for the reception of a cutting wire moved downwardly through the tub-butter block, together with the guide means for the cutting wire;

Figure 2 is a side elevational view of the handle frame carrying the cutting wire;

Figure 3 is a side elevational view with a tub-butter block illustrated by a broken line supported on the turn-table and inclosed by the assembled guide rings;

Figure 4 is a top plan view of one of the guide rings to be placed on the tub-butter block to guide the cutting wire in its horizontal movement through the tub-butter block;

Figure 5 is a side elevational view of the three cutter-wire guide rings in assembled formation;

Figure 6 shows the three cutter-wire guide rings separated from each other; and

Figure 7 is a vertical cross-sectional view taken on line 7—7 of Figure 1, showing the turn-table for the support of the tub-butter block and the means for holding the turn-table in its rotatably adjusted position.

Referring more in detail to the accompanying drawing, the tub-butter cutter comprises a turn-table construction having a stationary base plate 10 supported by corner feet 11 and while the base plate 10 is illustrated as being of rectangular formation, the same may be constructed in any shape desired.

The turn-table per se includes a circular bearing plate 12 mounted upon the upper face of the base plate 10 and anchored thereto in any suitable manner the rotatable turn-table disk 13 is of smaller diameter than the bearing plate 12 and is centrally mounted above the bearing plate, the turn-table disk 13 carrying an axially depending bearing pin 14 extending through registering axial openings 15 in the bearing plate 12 and base plate 10 as shown in Figure 7, a circular series of anti-friction bearing balls 16 being positioned between the turn-table disk 13 and bearing plate 12 as illustrated to facilitate ease of rotation of the turn-table disk 13.

The turn-table disk 13 is adapted to be held in equi-distantly spaced rotatably adjusted positions by means of a pin 17 vertically movable in a bearing 18 secured to the peripheral edge of the turn-table disk 13 above the underlying edge of the bearing plate 12, the latter having a circular series of equi-distantly spaced openings 19 for the reception of the lower end of the pin 17 as will be clearly understood from an inspection of Figures 1 and 7.

The cutting device for the tub-butter block that is placed upon the turn-table disk 13, as shown by the reference character B in Figure 3, comprises a cutting wire 20 shown in Figure 2, extending between the free ends of a pair of side legs 21 of a U-shaped frame that has a braced cross head 22. One end of the cutter wire 20 is anchored as at 23 to one leg 21 while the other end of the cutter wire 20 has an adjustable nut and screw combination 24 carried by the other leg 21 of the cutter wire frame. The cutter wire 20 is manually operated and is moved downwardly through the butter block B, the wire being guided in its movement by passage through perpendicular guides 25 rising from the base plate 10 at diametrically opposite sides of the bearing plate 12, the perpendicular guides 25 each comprising a pair of adjacently positioned rods, with the cutter wire 20 movable therebetween, the cutter wire 20 being moved downwardly through the tub butter block B for complete passage through the bottom portion of the butter block by reception in the intersecting transversely extending grooves or slits 26 formed in the upper face of the turn-table disk 13 as shown in Figure 1, the turn-table disk 13 being brought to rest upon the bearing plate 12 with a transversely extending groove 26 alined with the diametrically opposite perpendicular guides 25.

To guide the cutter wire 20 in its horizontal movement through the butter block B, there is provided a plurality of guide ring frames, preferably three and respectively designated by the reference characters 27, 28 and 29, each guide ring being of frusto-conical formation, as shown in Figure 6, for placement in enclosing relation to the tub-butter block and comprising upper and lower rings 30 connected by rods 31. When the several rings 27, 28 and 29 are placed in enclosing relation to the tub-butter block B, they assume the positions shown in Figure 5, being of frusto-conical formation and said ring frames are dimensioned to have a diameter slightly greater than the diameter of a standard tub of butter so that the ring frames may be placed upon an inverted tub of butter and out of contact therewith. To hold the ring frames 27, 28 and 29 against relative horizontal sliding movements and to provide a rigid assembly, the upper ring frame 27 and the intermediate ring frame 28, each carry a series of equi-distantly spaced depending marginal lugs 32 that overlie the adjacent lower ring frame and in effect provide an interlocking connection between said ring frames. The wire cutter 20 is moved over the upper ring of the upper ring frame 27 for the first horizontal cut and thereafter the upper ring frame 27 is removed, carrying therewith the lugs 32, and the wire cutter is then moved over the upper ring 30 of the intermediate ring frame 28, the third cut being made after the intermediate ring frame 28 is removed. With the foregoing cutting operation, the tub butter block B is cut into segments of equal length and without any wastage of the butter.

While there is herein shown and described the preferred embodiment of the invention, it is nevertheless to be understood that minor changes may be made therein without departing from the spirit and scope of the invention as claimed.

What is claimed as new is:

A base, means rotatably mounted on the base for the support of a block of butter, the base having apertures therein, said means having an aperture therein adapted to register with any one of the apertures in the base, a pin for maintaining the base and said means in registering relation, said means having radial grooves equally spaced circumferentially in the upper surface thereof, a frusto-conical open work frame adapted to be centrally positioned on said means, a second frusto-conical open work frame having the same cone angle as the first-named open work frame positioned in central abutting relation thereabove, the upper circumferential edge of each open work frame constituting a surface upon which a cutting element may be slid to provide a horizontal cut to a block of butter resting on said means within the open work frames, a plurality of pairs of guides mounted on the base in alinement with a diametrical groove formed by two radial grooves when positioned in alinement with the guide, and cutting means adapted to be moved downwardly in the guides and into the diametrical groove to form a vertical cut.

RICHARD MORIN.
RICHARD BLUSH.